(No Model.)
R. GARDNER.
CHURN.
No. 266,128. Patented Oct. 17, 1882.
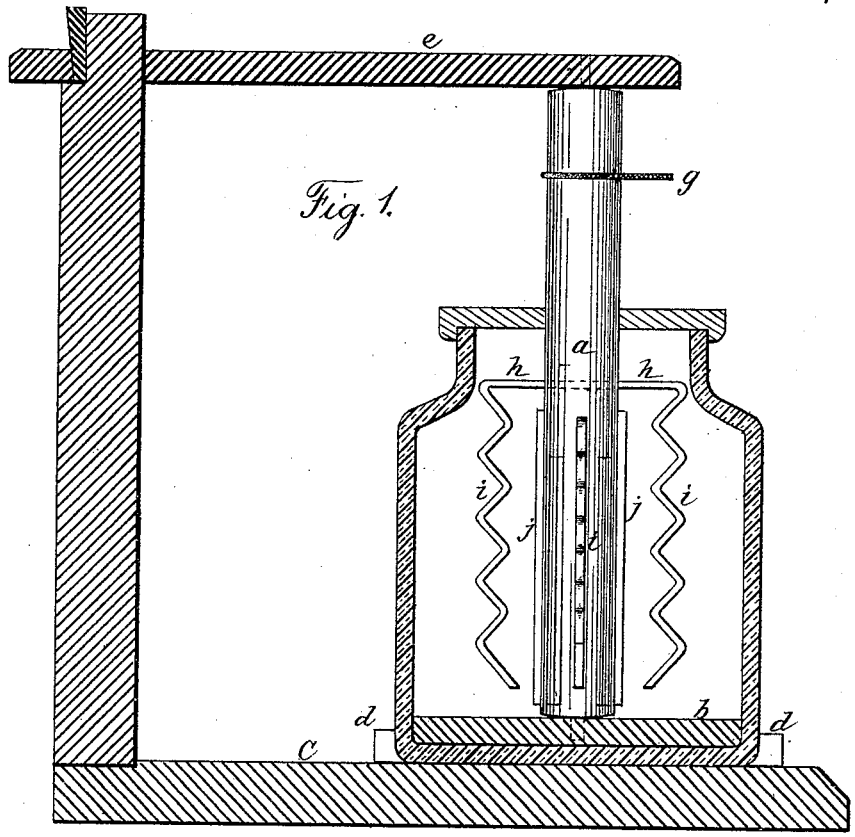
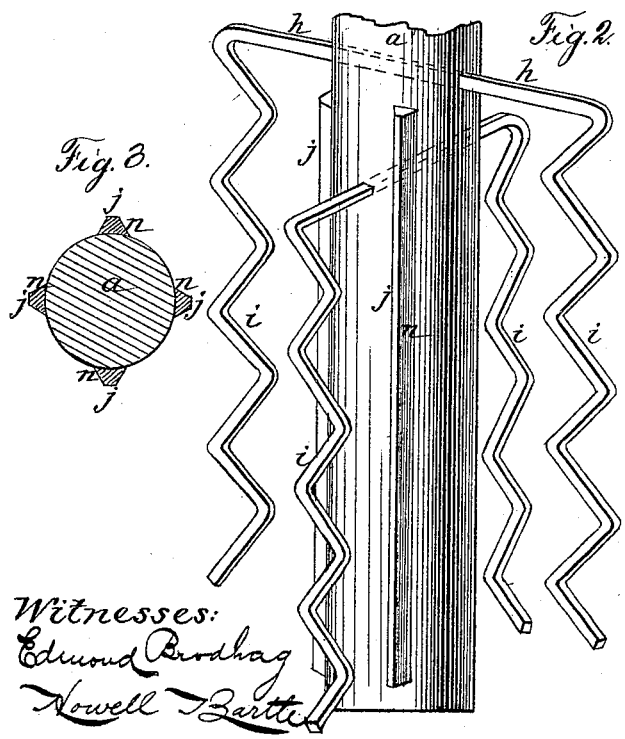
Witnesses:
Edmund Brodhag
Nowell Bartlett
Inventor:
pro Rufus Gardner,
Johnson & Johnson
Attys.

UNITED STATES PATENT OFFICE.

RUFUS GARDNER, OF SCOTLAND NECK, NORTH CAROLINA, ASSIGNOR OF ONE-HALF TO WILLIAM RUFUS WALSTON, OF SAME PLACE.

CHURN.

SPECIFICATION forming part of Letters Patent No. 266,128, dated October 17, 1882.

Application filed June 21, 1882. (No model.)

*To all whom it may concern:*

Be it known that I, RUFUS GARDNER, a citizen of the United States, residing at Scotland Neck, in the county of Halifax and State of North Carolina, have invented new and useful Improvements in Churns, of which the following is a specification.

My invention relates to improvements in churns in which the dasher is adapted to be revolved alternately in opposite directions.

My improvement consists of a churn-dasher consisting of the vertical shaft having surface-ribs, and the dasher-rods of angular form in cross-section, having the straight arms passing through the shaft, and the vertical arms of zigzag form, so as to present angular arms of sharp edges, which, being revolved under high velocity with a reverse action, cut and lighten up the cream, breaking the cells and effecting a quick disintegration.

Referring to the accompanying drawings, Figure 1 represents a vertical section of a churn embracing my improvements; Fig. 2, the dasher with rods of zigzag form; Fig. 3, a horizontal section of the shaft, showing the surface strips or bars.

I prefer to use a stone jar as the churn-vessel and to support the revolving shaft $a$ therein by a wooden bar, $b$, wedged in the bottom. The jar is held in place upon a board, $c$, by cleats $d$, and the upper bearing of the shaft is in a top bar, $e$, supported by a standard suitably braced to the bottom board. The top bar is secured to the top of the standard by a wedge, $f$, or other suitable means, so that it may be removed to remove the shaft from the jar. That portion of the shaft which extends above the jar is made cylindrical to receive a cord, $g$, wound around it, by which the dasher-shaft is propelled by a reverse or alternate action. The dasher is formed by galvanized rods of about three-sixteenths of an inch iron. These rods are of square form in cross-section, and are driven through holes bored in the shaft at different heights. They are bent at each end down along the shaft, so as to form horizontal and vertical arms $h$ $i$, each bent rod being in position at right angles to the other, and the horizontal part of each being at different heights in the shaft. The vertical part has a zigzag form with a multiplicity of angles or bends, as producing the best effect in cleaving the cream at every point with sharp angles, so as to separate the butyraceous globules quickly and completely. These angular rods extend nearly to the bottom of the jar, and are bent after they are driven through the shaft, so that the bent parts of each rod will be of equal length. When so driven into the shaft the rods will be tightly bound, so that they cannot turn in the shaft. The cutting and breaking action of the angular rods produces butter in a few minutes, and the provision of strips or bars $j$ on the surface of the shaft causes the cream to be thrown out against the angular rods, and for this purpose the acting faces $n$ of the strips may be beveled, as shown in Fig. 3.

A child can operate the churn in a sitting position by placing the feet against the end of the bottom board and pulling lightly upon the cord, rotating the dasher in opposite directions with great rapidity.

I claim—

The churn-dasher herein described, consisting of the vertical shaft having the surface-ribs $j$, and the dasher-rods of angular form in cross-section, having the straight arms $h$ passing through the shaft, and the vertical arms $i$ $i$ of zigzag form, as shown and described.

In testimony whereof I have hereunto set my hand in the presence of two subscribing witnesses.

RUFUS GARDNER.

Witnesses:
A. E. H. JOHNSON,
J. W. HAMILTON JOHNSON.